Aug. 8, 1944.   E. H. BROWN   2,355,052
APPARATUS FOR MEASURING STEAM-GAS RATIO
Filed Oct. 26, 1942   4 Sheets-Sheet 1

Earl H. Brown
INVENTOR

BY Arthur L. Davis

ATTORNEY

Earl H. Brown
INVENTOR

Patented Aug. 8, 1944

2,355,052

UNITED STATES PATENT OFFICE 2,355,052

APPARATUS FOR MEASURING STEAM-GAS RATIO

Earl H. Brown, near Sheffield, Ala., assignor to Tennessee Valley Authority, a corporation of the United States of America Application October 26, 1942, Serial No. 463,423

2 Claims. (Cl. 73—51)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of determining a variable composition, particularly when such composition consists of a mixture of readily condensable gas and relatively noncondensable gas.

The principle object of this invention is to provide an apparatus for the continuous determination of the amount of readily condensable gas or the ratio of readily condensable gas in a gaseous mixture containing relatively noncondensable gas. Other objects of this invention include the provision for an apparatus whereby the proportion of readily condensable gas in a gaseous mixture may be determined continuously with a relatively high degree of accuracy.

In carrying out certain manufacturing operations which involve the use of gaseous mixtures containing readily condensable gas and relatively noncondensable gas, it is necessary to maintain the amount or proportion of constituents at a predetermined value in order that the most efficient results may be obtained. The catalytic reaction between carbon monoxide and steam to produce hydrogen and carbon dioxide as an intermediate step in the production of a nitrogen-hydrogen mixture from coke, air, and steam is typical of an operation which requires that the steam-gas ratio of the reaction mixture be known accurately and maintained within the proper limits at all times. The methods previously employed for this purpose consist either in periodically condensing water from the water-gas mixture, measuring the condensate and gas that pass through the condenser, and then calculating the ratio; or periodically passing the steam-gas mixture through an inverted calibrated tube in an air bath until a constant temperature is attained, simultaneously closing the top of the tube to stop the gas flow, and inserting the gas-filled tube into a container of cold water, whereby the steam content of the tube is condensed, measuring the gas volume and calculating the steam-gas ratio. The first method is sufficiently accurate for plant control use but requires the constant attention of an operator. The second method is undoubtedly inaccurate, and the results obtained by its use are not reproducible since they may vary from 25 to 135 per cent of the results obtained by the first method.

The method of the present invention is directed to a continuous method for measuring the amount of readily condensable gas by measuring the time required to separate a predetermined quantity of condensate consisting of substantially all of the readily condensable gas from a stream of said mixture, and by determining the amount of readily condensable gas in said gaseous mixture from the relationship of the time required to separate said predetermined quantity of condensate and the amount of the gaseous mixture from which it was separated.

The apparatus of the present invention is directed to a combination of means for measuring the rate of flow of a stream of said gaseous mixture, means for condensing and separating said readily condensable gas therefrom, and means for indicating the time required for the collection of a predetermined quantity of condensate from said condensable material in relation to said rate of flow of said gas.

In the accompanying drawings, which form a part of the specification and wherein reference symbols refer to like parts wherever they occur, Fig. 1 is a schematic representation of one form of apparatus for the embodiment of the present invention wherein the amount of readily condensable gas in a gaseous mixture containing condensable gas and relatively noncondensable gas or the ratio of readily condensable to noncondensable gas in such a mixture is determined. Such a gaseous mixture is represented by a mixture of steam and water gas, wherein the proportion of steam therein requires accurate determination and control for uniform and efficient operation of carbon monoxide converters through which it is passed;

Figure 1:
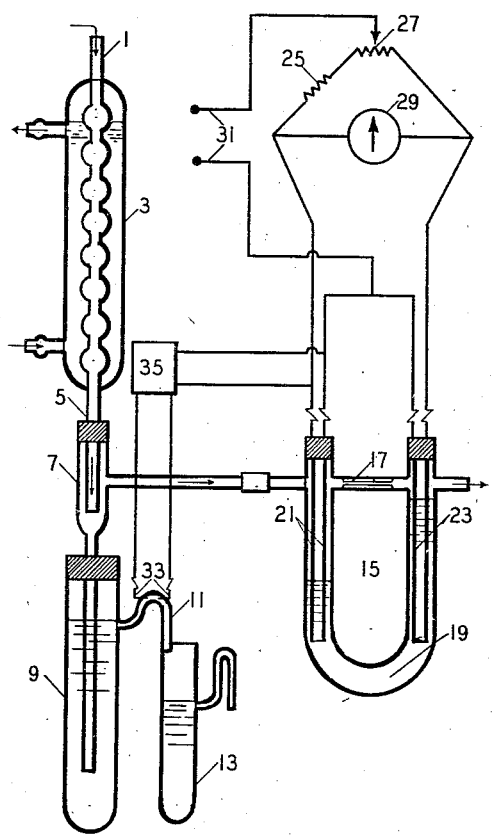
Figure 2:
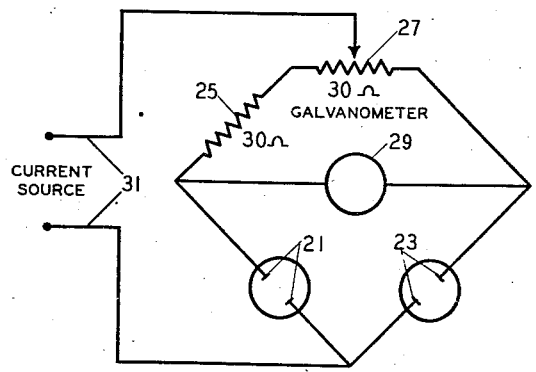
Fig. 2 is a wiring diagram of the Wheatstone conductance ratio bridge shown in Fig. 1 and illustrates the principles involved in the measurement of the amount of relatively noncondensable gas remaining after the separation of condensable gas from the gaseous mixture in which they were originally associated.

In Fig. 1, a stream of a gaseous mixture containing readily condensable gas and relatively noncondensable gas, such as a mixture of steam and water gas, is admitted to inlet 1 of condenser 3. The mixture of condensed water and water gas passes from outlet 5 thereof into separator 7 from which the condensed water passes to collector 9, from which it passes through trapped siphoning outlet tube 11 into a calibrated automatically siphoning measuring chamber 13. Collector 9 and measuring chamber 13 are so placed that the level of the liquid in the measuring chamber 13 rises above the bottom of siphoning outlet 11 before the siphoning from collector 9 is complete and the siphoning from measuring chamber 13 begins. This arrangement prevents gas from being trapped in siphoning outlet tube 11 and prevents variation in the volume of condensate siphoned off each time. The water gas from separator 7 passes to U-tube type flowmeter 15 with orifice 17 and containing a relatively low conductive liquid 19 wherein pairs of electrodes 21 and 23 are partially submerged at all times. As shown in Fig. 1 and further amplified in Fig. 2, electrodes 21 and electrodes 23 and resistance 25 are located in the legs of a Wheatstone conductance ratio bridge and variable resistance 27 provided for balancing the bridge in operation as indicated by galvanometer 29 when alternating current is applied from source 31. Resistance 25 and 27 and galvanometer 29 represent the combination of elements used for either indicating or recording the effect of variable rates of flow of the relatively noncondensable gas through flowmeter 15. Siphoning outlet tube 11 of collector 9 contains sealed-in contacts 33 which are connected to one side of the Wheatstone bridge through a vacuum tube relay 35. The change in level of liquid 19 which serves as the manometer fluid for flowmeter 15 causes the ratio of conductance between electrodes 21 and 23 to change. This conductance ratio is used as a measure of the flow of relatively noncondensable gas and is ordinarily indicated on a recorder chart. Each time a portion of condensate is siphoned from collector 9 into measuring chamber 13, electrical connection is made between contacts 33 whereby relay 35 is actuated and, in turn, shortcircuits one side of the Wheatstone bridge circuit with the resulting current break causing galvanometer 29 to become unbalanced, and the siphoning of the predetermined amount of condensate is then indicated by a horizontal line on the recorder chart.

Figure 3:
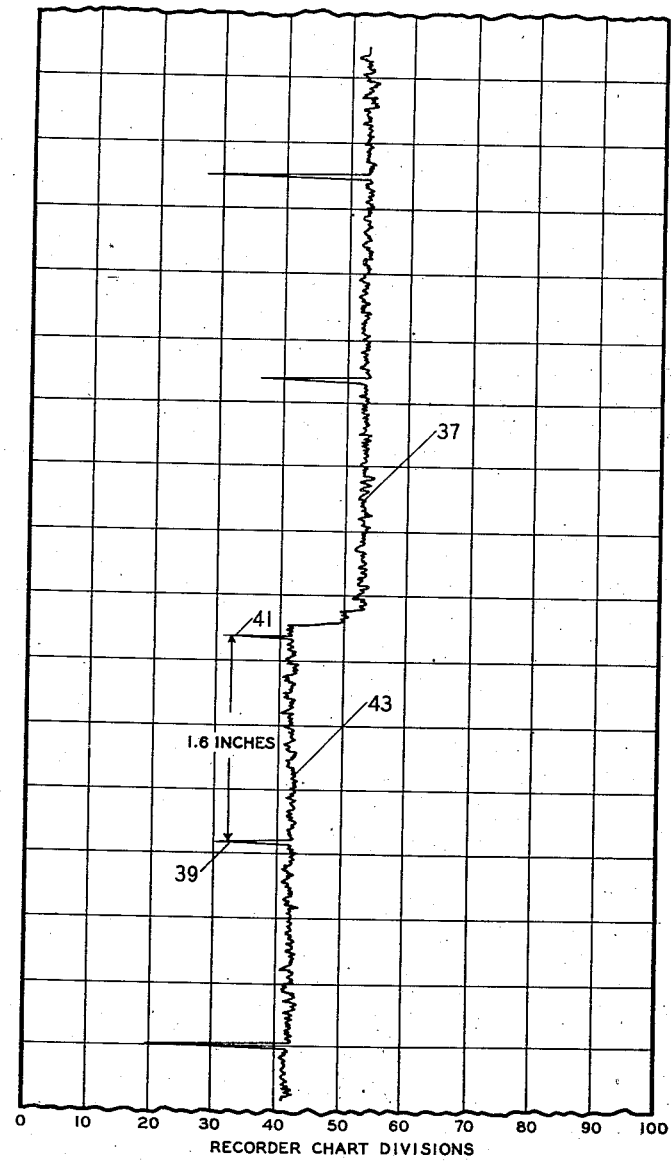
Fig. 3 is a chart showing the relationship between the rate of flow of relatively noncondensable gas as shown by transverse chart scale divisions and time, as represented by the longitudinal movement of the recorder chart during the successive separation and collection of a predetermined amount of condensable gas.

In Fig. 3, curve 37, in general, represents the rate of flow of relatively noncondensable gas after the separation of condensable gas from the gaseous mixtures containing the same. Portions of the curve 37, represented by 39 and 41, indicate the shortcircuiting of the Wheatstone bridge with the resulting break in record of rate of flow of gas giving a record of time required for the separation of a predetermined amount of readily condensable gas. For the present purpose, it is more convenient to use the lineal movement of the chart for this purpose. During the time required for the collection of a predetermined quantity of condensate as indicated by portions of curve 39 and 41, the lineal movement of the chart is 1.6 inches, and the average rate of flow of relatively noncondensable gas as represented by portion of curve 43 is indicated as 41.5 recorder chart scale divisions.

Figure 4:
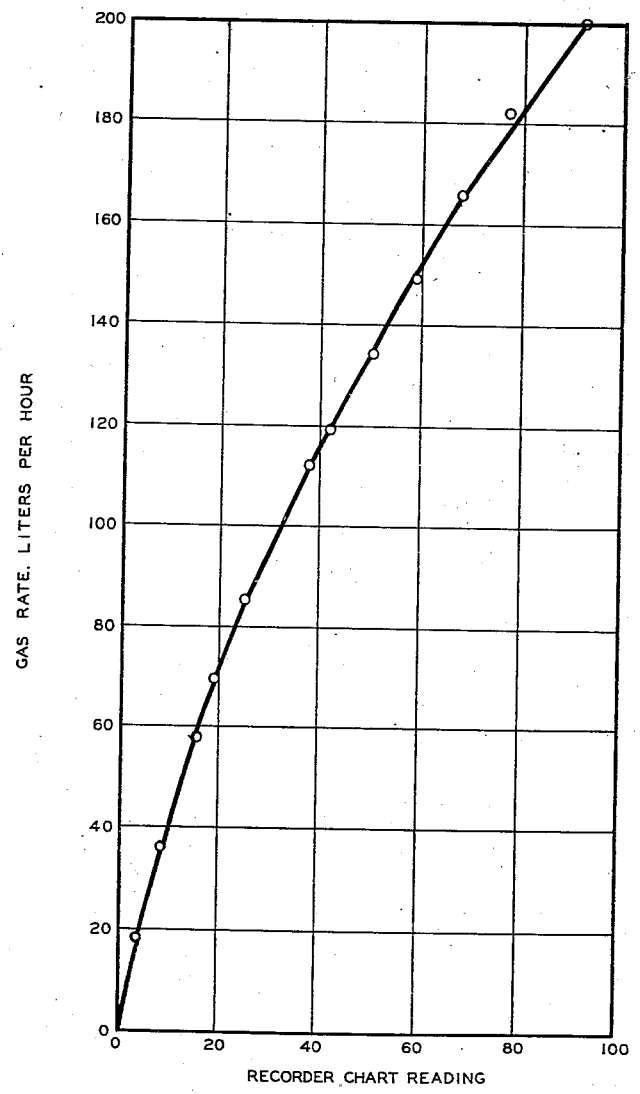
Fig. 4 is a chart showing the relationship between rate of flow of relatively noncondensable gas and the recorder chart division readings.
Figure 5:
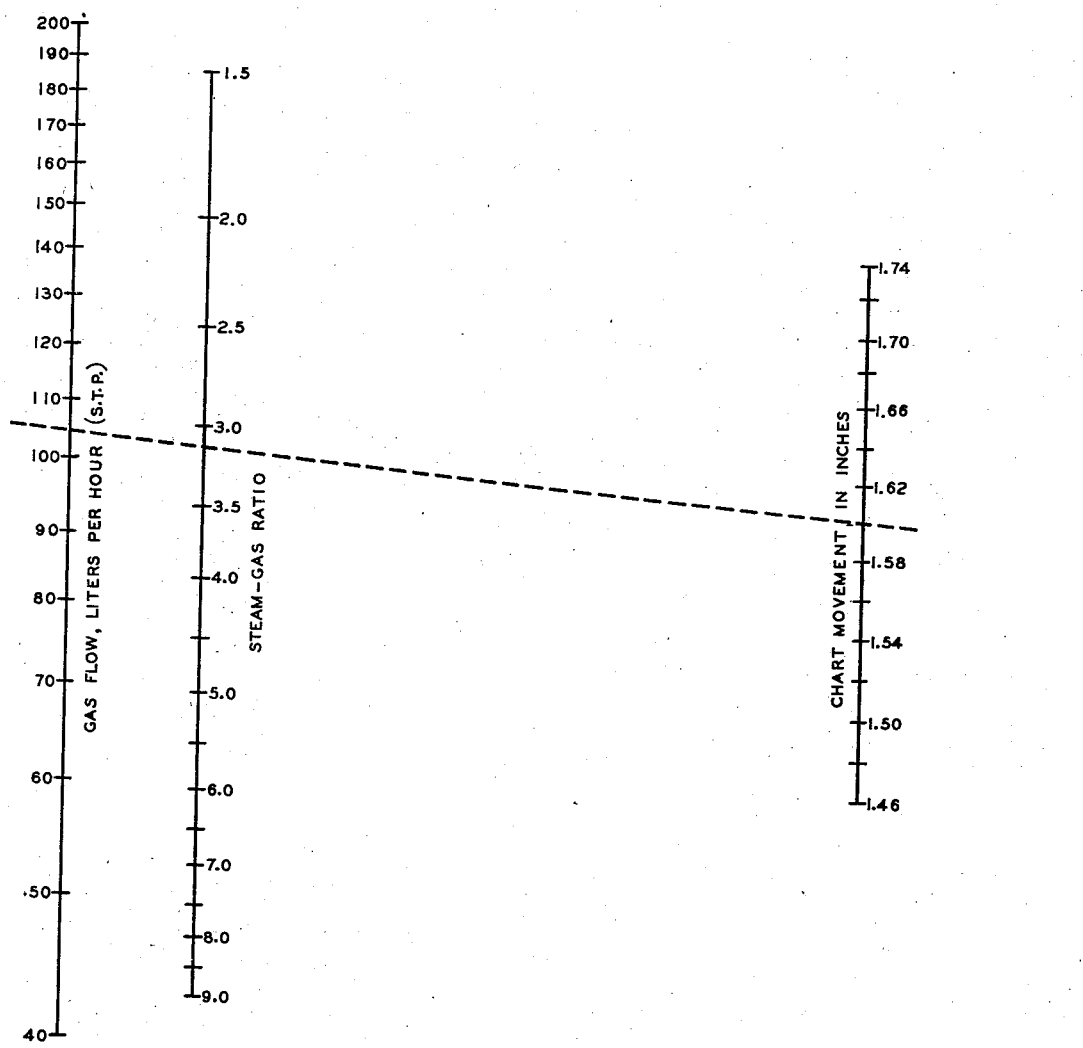
Fig. 5 is a nomograph used for determining steam-gas ratio from the rate of flow of noncondensable gas and movement of the recorder chart as illustrated in Figs. 3 and 4.

Fig. 4 is a graph for converting recorder chart readings for a specific chart and flowmeter orifice into rates of flow of gas in liters per hour. The values so obtained are uncorrected for temperature, pressure, and water content of the relatively noncondensable gas. These corrections are now applied to the rate of gas flow as read from a chart such as that shown in Fig. 4 and by application of the rates of gas flow so corrected and the movement of the chart in inches during the collection of a predetermined amount of condensate, the ratio of condensable gas, such as steam, to noncondensable gas is read directly from a nomograph such as that shown in Fig. 5.

The application of the nomograph is illustrated by a chart movement of 1.6 inches (which is equivalent to a definite time for constant chart movement) required for the collection of 51 ml. of water condensed from a steam-gas mixture and the observed rate of flow of 119 liters/hr. (104 l./hr. S. T. P.) of noncondensable gas during the period of collection of said water, with the resulting indication of a steam-gas ratio of 3.14.

The derivation of the formula for calculation of the ratio of readily condensable gas to relatively noncondensable gas, as applied to a steam water gas mixture, is shown as follows:

Molecular weight of condensate is equivalent to 22.4 liters (S. T. P.) of condensable gas     (1)

Volume of steam (liters S. T. P.) condensed between siphoning periods $= $ ml. condensate $\times \frac{22.4}{18}$     (2)

Volume of gas $= $ l./hr (from chart calibration) $\times$ time between siphoning periods. However, the time is measured as the distance the recorder chart moves, hence, time (hrs.) $= \frac{\text{chart distance (in in.) between siphoning periods}}{\text{chart speed (in in./hr.)}}$     (3)

Volume of gas (liters S. T. P.) $=$ $\frac{\text{l./hr.} \times \text{chart dist. (in in.)} \times \text{press., temp. \& water vap. corr.}}{\text{chart speed (in in./hr.)}}$     (4)

Steam-gas ratio $= \frac{\text{volume of steam (S. T. P.)}}{\text{volume of gas (S. T. P.)}}$     (5)

Steam-gas ratio $=$ $\frac{\text{ml. condensate} \times \frac{22.4}{18}}{\frac{\text{gas l./hr.} \times \text{chart dist. (in in.)} \times \text{press., temp. \& w.v. corr.}}{\text{Chart speed (in./hr.)}}}$     (6)

Steam-gas ratio $= \frac{(\text{ml. condensate}) \times 22.4 \times (\text{chart speed in in./hr.})}{(\text{gas l./hr.}) \times (\text{chart dist. in in.}) \times 18 \times (\text{press., temp. \& w.v. corr.})}$     (7)

For any particular installation the chart speed and volume of condensate will be fixed and can be incorporated into a constant.

Factor I $= \frac{(\text{ml. condensate}) \times 22.4 \times (\text{chart speed in in./hr.})}{18}$     (8)

Temperature and pressure corrections, which vary with atmospheric conditions, should be converted to reciprocals to place this value in the numerator:

Factor II $= \frac{1}{\text{temp., press., and water vapor corr.}}$     (9)

By substituting factors I and II in Equation 7,

Steam-gas ratio $= \frac{\text{Factor I} \times \text{Factor II}}{(\text{liters gas/hr.}) \times (\text{chart dist. in in.})}$     (10)

An example of the operation of the present invention is given for the determination of readily condensable gas (steam) to relatively noncondensable gas in a steam-water gas mixture. The determination is carried out in accordance with the description given in connection with Fig. 1, using a recorder which had a chart speed of 8.25 inches/hr. During the collection of 51 ml. of condensate, the chart movement was 1.6 inches, and the rate of flow of relatively noncondensable gas was 119 liters/hr. The atmospheric pressure at the time of the determination was 754 mm. Hg, and the temperature was 24° C. By reference to standard tables, the correction factor for temperature pressure and water vapor content was calculated to be 0.874. By the application of these data to Equations 8 and 9, $$\text{Factor I} = \frac{51 \times 22.4 \times 8.25}{18} = 523$$

$$\text{Factor II} = \frac{1}{0.874} = 1.143$$

and by the application of the values so obtained under Equation 10, $$\text{Steam-gas ratio} = \frac{523 \times 1.143}{119 \times 1.6} = 3.14$$

The method of the present invention is applicable to the determination of the amount of readily condensable gas or the ratio of readily condensable gas to relatively noncondensable gas in a gaseous mixture, wherein it is necessary to know the molecular weight of the readily condensable gas in order that a predetermined amount of condensate may be collected whether such amount corresponds to such molecular weight or any multiple thereof. Obviously, it is desirable to separate portions of condensate of uniform volume in order that factor I in Equation 8 may be a constant and thus materially simplify calculations. However, any variation in the volume of condensate collected does not in any way affect the present method so long as cognizance is taken of the actual volume collected.

It will be seen, therefore, that this invention actually may be carried out by the use of various modifications and changes without departing from its spirit or scope.

I claim:

1. An apparatus for continuously determining the ratio of readily condensable to relatively noncondensable gas in a gaseous mixture, which comprises the combination of
(a) Means for condensing said readily condensable gas and separating said noncondensable gas from a stream of said gaseous mixture,
(b) Means for collecting successive quantities of all of the condensate produced wherein each quantity is equivalent to a predetermined volume of condensable material,
(c) Means for measuring the rate of flow of noncondensable gas so separated during the time required to separate each said quantity of condensate,
(d) Electrical means for recording the rate of flow so measured, and
(e) An electrical circuit means responsive to the flow of each successive quantity of condensate so collected and so associated with said electrical recording means to momentarily disrupt the record of rate of flow and thereby record the time required for the collection of each successive quantity of condensate.

2. An apparatus for continuously determining the ratio of readily condensable to relatively noncondensable gas in a gaseous mixture, which comprises the combination of
(a) Means for condensing said readily condensable gas and separating said noncondensable gas from a stream of said gaseous mixture,
(b) Means for collecting successive quantities of all of the condensate produced wherein each quantity is equivalent to a predetermined volume of condensable material,
(c) Means for measuring the rate of flow of noncondensable gas so separated during the time required to separate said quantities of condensate,
(d) Means for recording the rate of flow so measured comprising an electrical circuit responsive to variations in said rate of flow, and
(e) A second electrical circuit means responsive to the flow of each successive quantity of condensate so collected comprising electrical contacts adapted to close said second circuit means during the time each successive quantity of condensate is collected and a relay responsive to that portion of the second circuit means containing the contacts, and so associated with the first mentioned electrical circuit that the operation of the relay momentarily disrupts the record of rates of flow and thereby records the time required to collect the respective successive quantities of condensate.

EARL H. BROWN.